March 6, 1962 C. E. MONSEES ETAL 3,023,823
WEIGHING APPARATUS
Filed June 29, 1959 2 Sheets-Sheet 1
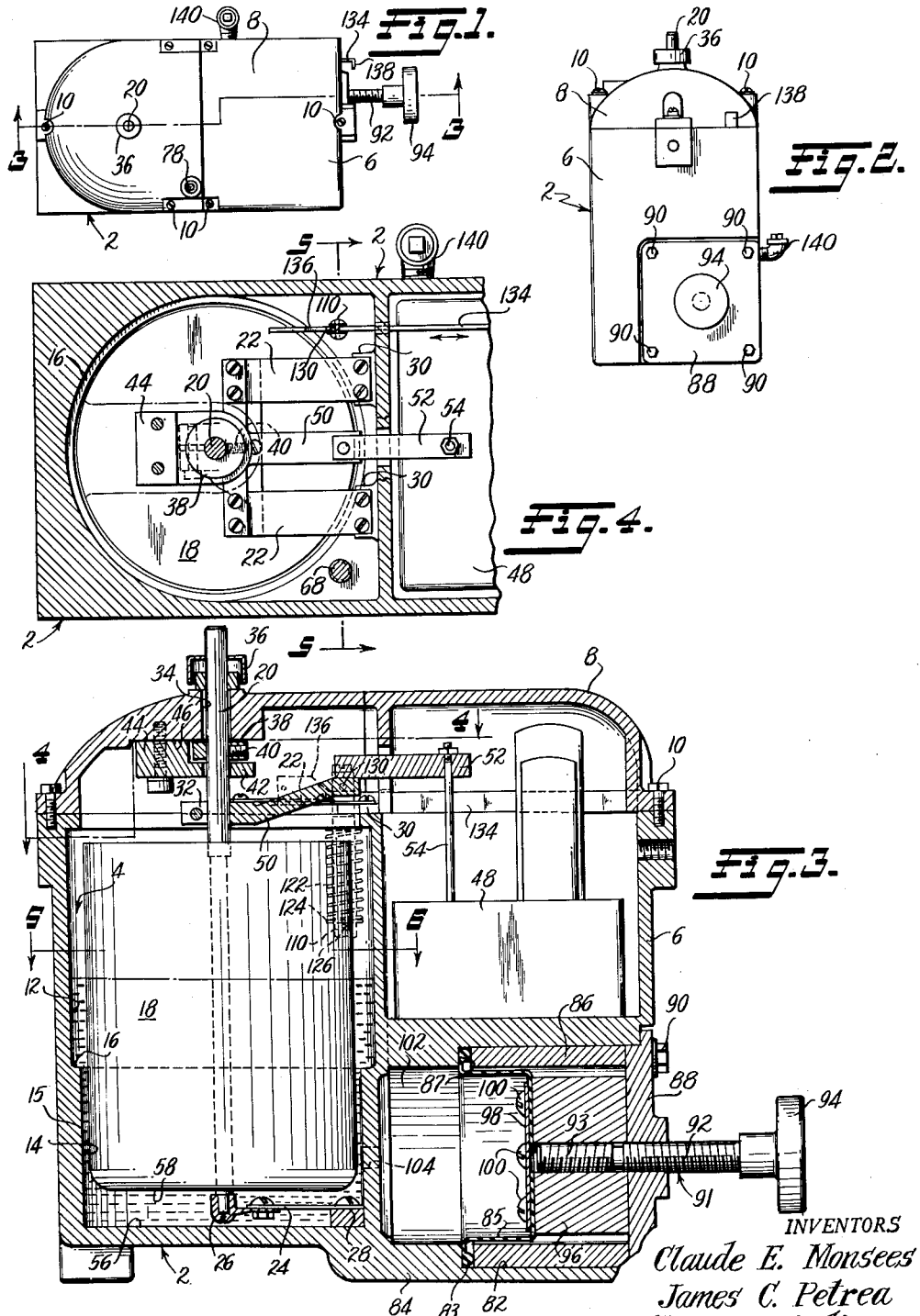
INVENTORS
Claude E. Monsees
James C. Petrea
BY Bacon & Thomas
ATTORNEYS

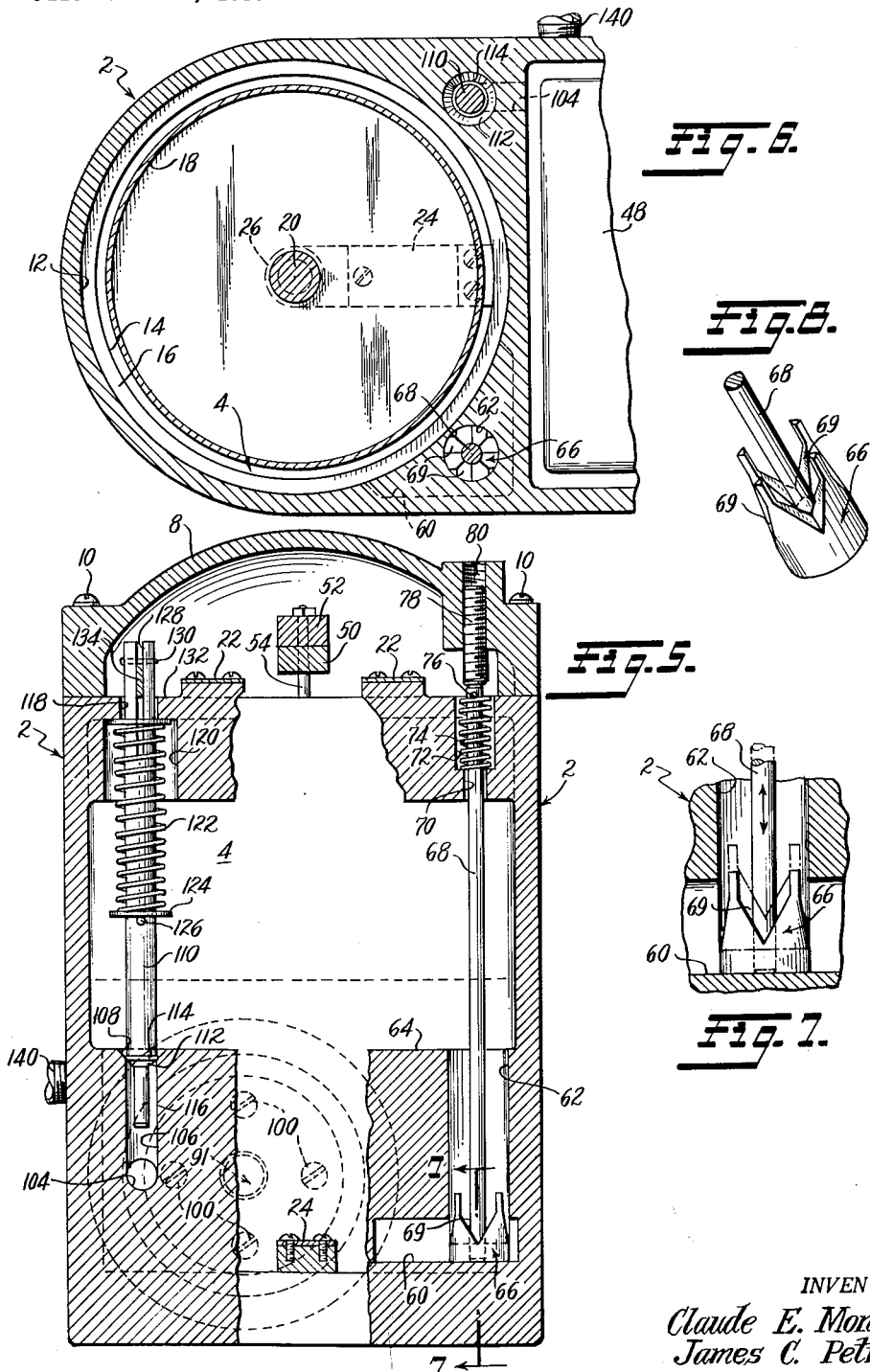

United States Patent Office 3,023,823
Patented Mar. 6, 1962

3,023,823
WEIGHING APPARATUS
Claude E. Monsees and James C. Petrea, Durham, N.C., assignors to Sperry Rand Corporation, Wilmington, Del., a corporation of Delaware
Filed June 29, 1959, Ser. No. 823,584
10 Claims. (Cl. 177—207)

This invention relates to an improvement in hydraulic weighing machines wherein a float is buoyantly supported in a body of liqud. A product-supporting container is customarily mounted on the float to receive the material to be weighed and the depth to which the float sinks in the liquid is indicative of the total weight of the product. The present invention relates to improvements in such a device.

The improvements of the present invention relate to the shape of the interior of a tank for holding a body of liquid, usually oil, and in which the float is buoyantly supported. The lower portion of the tank interior is of smaller transverse dimension than the upper portion and conforms quite closely to the horizontal outline of the float, which extends into the lower portion. The structure provides for very small clearance between the float and vertical walls of the lower portion of the tank and functions to dampen vertical movements of the float by restricting the flow of oil through the small passageway between the float and tank walls. The features of the tank just described further provide for temperature compensation whereby changes in temperature of the oil do not affect its buoyant effect on the float, as will be explained in greater detail.

A supply reservoir adjacent the tank is connected to the interior of the tank by means of a manually controllable valve so that oil may be forced into or withdrawn from the tank, as desired, to adjust the apparatus. A by-pass is provided in the tank structure and communicating with the space below the float and the space in the upper portion of the tank. A novel throttling valve is provided in the by-pass whereby its effective size may be varied to regulate the dampening effect caused by the piston action of the float in the smaller lower portion of the tank interior.

It is therefore an object of this invention to provide an improved hydraulic weighing device having highly effective, simple, and adjustable dampening features.

Another object of the invention is to provide a weighing device of the type set forth including means for selectively regulating the depth of the supporting liquid in the tank.

Still another object of the invention is to provide an improved hydraulic weighing device so constructed and arranged that it automatically compensates for changes in temperature.

A further object of the invention is to provide an improved hydraulic weighing device that is simple in construction, economical to produce, and yet efficient and reliable in operation.

A still further object is to provide a float-type weighing device having a higher natural frequency, for faster response.

Other objects and advantages will become apparent to those skilled in the art as the description proceeds with reference to the accompanying drawings, wherein:

FIG. 1 is a top plan view of a weighing device embodying the present invention;

FIG. 2 is a side elevational view as seen from the righthand side of FIG. 1;

FIG. 3 is a vertical sectional view, on an enlarged scale, taken along the line 3—3 of FIG. 1;

FIG. 4 is a fragmentary horizontal sectional view taken substantially along the line 4—4 of FIG. 3;

FIG. 5 is a vertical sectional view, on a further enlarged scale, taken along the line 5—5 of FIG. 4;

FIG. 6 is a horizontal sectional view, on a further enlarged scale, taken along the line 6—6 of FIG. 3;

FIG. 7 is a fragmentary vertical section, on an enlarged scale, taken on line 7—7 of FIG. 5; and FIG. 8 is a perspective view of the movable valve element of FIG. 7.

The weighing apparatus of the present invention comprises a main housing portion 2 having a hollow interior or tank chamber 4 and a lateral extension 6 housing auxiliary mechanisms, to be described later. The housing 2 is formed with an open top but is covered by a separate cover member 8 fixed thereto by bolts 10. The tank chamber 4 is provided with an upper portion 12 and a lower portion 14. The lower portion 14 is of lesser diameter than the upper portion 12 and the portions meet at a juncture defined by an abrupt step 16. As shown, the tank chamber is of generally cylindrical configuration but it is to be understood that it could be of any other desired cross-sectional shape.

A hollow float 18 is mounted in the tank chamber 4 by being secured to a vertical shaft or rod 20 extending therethrough and which is, in turn, supported for vertical movement in the tank chamber by parallel leaf spring supports 22 and 24. The leaf spring supports function in the manner of a parallelogram to maintain the rod 20 in a vertical position while permitting vertical movement thereof. The leaf spring 24 is secured to a fitting 26 on the lower end of shaft 20 and to the housing 2 adjacent the side of the tank chamber, at 28.

There are a pair of leaf springs 22 at the upper end of the float 18, each being fixed to the housing 2 on suitable bosses at 30. The other ends of leaf springs 22 are fixed to lateral ears extending from a bracket 32, which bracket is in turn clamped to the shaft 20. It will thus be seen that the three leaf springs maintain the shaft 20 in a vertical position while permitting vertical movement of that shaft and the float 18 fixed thereto.

The shaft 20 extends upwardly and loosely through an opening 34 in the cover 8 and is provided with a protective hood or shield 36 to prevent unwanted entry of foreign matter into the tank chamber. While not shown in the drawings, it is contemplated that a suitable receptacle for the product to be weighed will be mounted on the upper end of the shaft 20 for movement therewith.

A collar 38 is adjustably fixed on shaft 20, by means of set screw 40, closely below the cover 8 and between the cover and an abutment 42 on bracket 44 which is in turn fixed to the underside of cover 8. The abutment 42 is spaced from the undersurface 46 of cover 8 a distance slightly greater than the vertical thickness of the collar 38. Thus the collar 38 limits vertical movements of the shaft 20 and float 18 to a very small value. With no product in the weighing receptacle the float tends to move upwardly but will be stopped by engagement of collar 38 with surface 46. The parts are so adjusted that placement of the product on the weighing receptacle will cause no downward movement on the float 18 until the desired weight has been reached. At that time the float 18, shaft 20 and collar 38 move downwardly until the collar 38 is stopped by abutment 42. The downward movement permitted is very small but sufficient to actuate a detector device 48 housed in the extension 6 of the housing 2. The bracket 32 previously referred to is provided with a central arm 50 to which an extension member 52 is secured. The extension member 52 extends into the extension 6 of housing 2 and engages an operating arm 54 of the detecting device 48. The detecting device 48 may be of any suitable type such as a microswitch or an electronic device capable of detecting minute movements of its movable element 54 to produce an output signal, usable to indicate the attainment of weight by the weighing device. Many such detecting devices are known and will not be described in detail here.

The lowermost portion 14 of the tank 4 has been described as being of smaller diameter than the upper portion 12. Thus it can be said that the lower portion 14 is defined by a projection 15 extending inwardly from the wall of the upper portion 12. The volume of the projection 15 (annular in the form shown) is made as nearly as possible equal to the volume of the space between the bottom surface 56 of the tank chamber and the bottom surface 58 of the float. The reasons for constructing the parts in such relationship will be shown later.

Near the lowermost portion of the tank chamber 4, a small lateral chamber 60 (see FIGS. 5 and 6) is formed. The small chamber 60 extends into a corner area of the housing 2 adjacent the tank chamber 4. A vertical bore or passageway 62 extends upwardly from the small chamber 60 through an upper surface 64 of the corner portion of the housing 2 at the level of the step 16 previously described, and constituting a continuation thereof. A cylindrical throttling valve plug 66 is slidably mounted in the bore 62 and fixed to the lowermost end of a rod 68 extending upwardly through the bore 62. The plug 66 is provided with transverse upwardly facing and angularly related generally V-shaped notches 69 in its upper portion. The rod 68 extends upwardly through the upper portion of tank chamber 4 and through an opening 70 in a portion of the housing 2 into a counterbore 72. A compression spring 74 bears against the lower end of the counterbore 72 and against a transverse pin 76 in rod 68, to thereby urge the rod 68 and plug 66 upwardly. An adjusting screw 78 is threadedly mounted in a threaded opening 80 in the cover 8 and in alignment with the upper end of rod 68. The adjusting screw 78 may be threadedly adjusted either upwardly or downwardly to adjust the extent to which plug 66 projects from bore 62 into chamber 60. FIG. 7 shows the plug 66 in full lines in its lowermost position and in dotted lines in an intermediate position thereabove. It will be apparent that the various positions of adjustment of the plug 66 result in changing the effective area, through notches 69, of the by-pass passageway comprising small chamber 60, notches 69 and bore 62. Thus the freedom with which oil can flow through the described passageway can be regulated at will. By the means described the dampening effect of the small space between float 18 and the sides of the lower portion 14 of the tank may be regulated.

The lower portion of the extension 6 of housing 2 is provided with a lateral bore 82 (FIG. 3) in which a reduced portion 84 is formed to provide a shoulder 87 against which the peripheral bead 83 of flexible diaphragm 85 bears. A cap or closure member is provided with a clamping ring portion 86 in bore 82 engaging the opposite side of the peripheral bead 83 of diaphragm 85 and a cover portion 88 secured to extension 6 by bolts 90 to close bore 82 and to urge clamping ring portion 86 inwardly to securely clamp and seal the bead 83 against shoulder 87. An adjusting screw 91 having righthand threads 92 and lefthand threads 93 is threaded through righthand threads in the cover portion 88 with its lefthand threads 93 engaging corresponding lefthand threads in a block 96. The block 96 is fixed to the diaphragm 85. A plate 98 abuts the inner face of the diaphragm 85 and screws 100 serve to clamp the plate 98 to block 96 with the diaphragm clamped therebetween.

It will thus be seen that the inner surface of reduced portion 84 and the inner surface of diaphragm 85 define an expansible chamber 102. This chamber is employed as a reservoir for oil to regulate the quantity of oil in the tank 4. The hand wheel 94 may be turned in one direction to advance the block 96 inwardly, thus moving the assembly of plate 98 and block 96 inwardly to thereby reduce the volume of expansible chamber 102 and force oil therefrom into the tank chamber. By turning screw 91 in the other direction, chamber 102 is permitted to expand and allow oil to flow from the tank 4 into the reservoir chamber. However, the expansible chamber 102 is not to be in constant communication with the tank 4. A passageway 104 (see FIGS. 5 and 6) extends from an end of the chamber 102 into communication with a vertical bore 106 extending upwardly through the surface 64 previously described. The upper end of bore 106 is flared outwardly to define a conical seat 108.

A valve rod 110 extends vertically into the bore 106 and is provided with a tapered portion 112 having an O-ring or other suitable sealing means 114 thereon. A pilot portion 116 on the end of rod 110 extends downwardly into the bore 106. The valve rod 110 extends upwardly through an opening 118 in the top portion of the housing 2. The opening 118 communicates with the upper end of a downwardly facing counterbore 120 in which one end of a compression spring 122 is seated. The other end of spring 122 bears against a washer or collar 124 surrounding rod 110 and bearing against a transverse pin 126 in the rod. Thus it will be seen that compression spring 122 normally holds the valve rod 110 in its lowermost position to firmly seat O-ring 114 on valve seat 108 to isolate the expansible chamber 102 from the tank chamber 4.

The uppermost end of the valve rod 110 is provided with a vertical transverse groove or slot 128 and a pin 130 extends across the slot 128 adjacent the upper end thereof but spaced above the upper surface 132 of the housing 2. A cam bar 134 rests slidably upon the upper surface 132 and extends into the slot 128 below pin 130. The portion of the cam bar 134 adjacent pin 130 (see FIG. 3) is formed as a tapered cam 136. The cam bar 134 extends along the top of the housing 2 across the extension 6 of the housing and outwardly through an opening in the cover 8 to a handle portion 138 on the exterior of the housing (see FIG. 1).

When it is desired to regulate or change the depth of the oil in tank 4, the operator grasps handle 138 and pulls the cam rod 134 outwardly to thereby cause cam 136 to lift valve rod 110 and open the passageway communicating between expansible chamber 102 and tank chamber 4. With the valve thus held opened, the hand wheel 94 may be manipulated to perform the desired adjustment and regulation of the oil depth.

A suitable elbow fitting 140 defines a filler fitting whereby the supply of oil in expansible chamber 102 may be replenished when necessary.

The dampening feature of the present invention, provided by the shape of the tank chamber 4, performs a further function, that is, it effects automatic compensation for changes in temperature of the oil in the tank. To properly describe this feature of the invention, let us visualize a tank having continuous vertical side walls (without the smaller lower portion 14) and a flat bottom with a float therein also having continuous vertical side walls and a flat bottom. The temperature compensating features will be shown by mathematical derivation wherein:

$t_1$ = low temperature
$t_2$ = high temperature
$P_1$ = mass density of oil at $t_1$
$P_2$ = mass density of oil at $t_2$
$V_1$ = total volume of oil in tank at $t_1$
$V_2$ = total volume of oil in tank at $t_2$
$m_1$ = total mass of oil in tank at $t_1$
$m_2$ = total mass of oil in tank at $t_2$
$F_1$ = buoyant force acting on float at $t_1$
$F_2$ = buoyant force acting on float at $t_2$
$X$ = submerged depth of float at $t_1$
$X + \Delta X$ = submerged depth of float at $t_2$
$\Delta t = t_2 - t_1$
$\alpha$ = cubical coefficient of thermal expansion of oil $A_f$ = cross-sectional area of float
$A_t$ = cross-sectional area of tank The tank and float as visualized above both have parallel walls and are parallel to each other.

Since $$P_1 = \frac{m_1}{V_1}; \quad P_2 = \frac{m_2}{V_2} \text{ and } m_1 = m_2$$

then $$P_2 = \frac{V_1}{V_2} \cdot P_1 \quad (1)$$

Now $$F_1 = A_f \cdot X \cdot P_1 \quad (2)$$

and $$F_2 = A_f(X + \Delta X) P_2 \quad (3)$$

For a temperature compensating system F must be the same at any temperature. Therefore Equations 2 and 3 are equated.

$$F_1 = F_2$$

or $$A_f X P_1 = A_f(X + \Delta X) P_2$$

or $$X P_1 = (X + \Delta X) P_2 \quad (4)$$

Now if the thermal expansion equation $$(V_2 = V_1 + V_1 \alpha \Delta t)$$

is substituted into Equation 1 we get $$P_2 = \frac{V_1}{V_1 + V_1 \alpha \Delta t} P_1$$

or $$P_2 = \frac{P_1}{1 + \alpha \Delta t} \quad (5)$$

Now by substituting Equation 5 into Equation 4 we get $$X P_1 = (X + \Delta X) \frac{P_1}{1 + \alpha \Delta t}$$

or $$X = \frac{X + \Delta X}{1 + \alpha \Delta t}$$

or $$\Delta X = X \alpha \Delta t \quad (6)$$

Since the walls of the tank and float are parallel, they have constant cross-sectional areas, and we can say that $$\Delta V = \Delta X (A_t - A_f) \quad (7)$$

Also, from the thermal expansion theory we can say that $$\Delta V = V_1 \alpha \Delta t \quad (8)$$

By equating Equations 7 and 8, substituting Equation 6 for $\Delta X$, and solving for $V_1$ we get $$V_1 = X(A_t - A_f) \quad (9)$$

Equation 9 states that for a temperature compensating system, the total volume of oil in the tank must be equal to the difference in cross-sectional areas of the tank and float, multiplied by the depth to which the float is submerged. To accomplish this with a system similar to that visualized above, one can see that the float must rest on the bottom of the tank.

Total volume of oil = $(A_t - A_f) X$

An arrangement with no oil beneath the float, obviously would not serve as a weighing unit. Therefore, for something more practical, the situation described above can be satisfied by reducing the cross-sectional area of the lower section of the tank, and by adding this removed volume of oil to the under side of the float as shown in FIG. 3.

The operating oil level must always be, at least, above the step 16 in the tank so that a constant oil surface area may be obtained. But to simplify the following derivation, of a relationship between tank dimensions, let us assume the oil level to be exactly at the step 16 in the tank.

Therefore $$V_1 = (X + C) A_p - X A_f \quad (10)$$

By equating Equations 9 and 10 we get $$X(A_t - A_f) = (X + C) A_p - X A_f$$

By cancelling and rearranging we get $$\frac{X}{C} = \frac{A_p}{A_t - A_p} \quad (11)$$

In the above, C is the clearance between the bottom of the float and the bottom of the tank, and $A_p$ is the cross-sectional area of the lower portion 14 of the tank.

Equation 11 is a relationship between tank dimensions and the position of the float, and is valid for a simple tank and float system with square corners. Where a more complex system exists, such as one with internal parts and cavities within the tank, radiused corners on the float, etc., the values of Equation 11 should be modified slightly to allow for such differences.

The arrangement as shown in FIG. 3 not only gives the correct geometry for a temperature compensating system, but also makes it possible to convert the bottom section of the tank into a dashpot with the float acting as the piston.

The idea which this derivation supports, is that when a liquid expands its density decreases as its volume increases. Therefore, if the correct volume of liquid is incorporated around the float, the mass of liquid displaced and the buoyant force on the float are unchanged by thermal expansion of the liquid.

A system as shown in FIG. 3 is self-compensating for thermal expansion of the oil and ignores that of the tank, float, and other metal parts of the system. But since the variations in the metal parts are very small as compared to that of the oil, a slight change in the volume of oil beneath the float will cause a variation due to the oil to either add to, or subtract from that of the metal parts. At a point where the variations due to the oil and to the metal parts are equal and opposite the system is perfectly compensating to temperature change. At this point the stop collar 38 is set, therefore preventing any further substantial change in the volume of oil below the float since it limits float movement to a very small value.

It can now be seen that for practical temperature compensation the volume of oil in the lower section 14 of the tank must be held substantially constant, therefore, the movement of the float 18 must be held to a minimum, and the operating oil levels for various product weights must always be within the upper section 12 of the tank where the cross-sectional area is constant. Since it is necessary to maintain a constant volume of oil in the lower section 14 of the tank, and a constant cross-sectional area in the upper section 12, any means employed for changing the oil level, as described, must necessarily be isolated from the tank.

While a single specific embodiment of the invention has been shown and described herein, it is to be understood that other modifications may be resorted to within the scope of the appended claims.

We claim:

1. Weighing apparatus comprising, a tank chamber adapted to hold a body of liquid, a weighing float in said chamber with its bottom adjacent but spaced from the bottom of said chamber, said float comprising a hollow body of substantially uniform transverse dimensions from top to bottom thereof, means mounting said float in said chamber and guiding the same for substantially vertical movement therein, the lower portion of said chamber being of less transverse dimensions than the upper portion thereof, said float extending from said upper portion into said lower portion with its side surfaces closely adjacent the inner surface of said lower portion, the spacing between said float and lower portion of said chamber being sufficiently small to define a restricted passageway serving as a dash pot to dampen vertical movements of said float.

2. Apparatus as defined in claim 1 wherein the inside surfaces of said upper and lower portions of said chamber and the side surfaces of said float are all vertical.

3. Apparatus as defined in claim 1 wherein the juncture between said upper and lower portions of said chamber is defined by an abrupt step.

4. Apparatus as defined in claim 1 including means defining a by-pass passageway between said upper and lower portions of said chamber for conducting any liquid present therethrough, and selectively adjustable throttling means in said passageway for changing the effective size thereof.

5. Apparatus as defined in claim 4 wherein said passageway is in the form of a small chamber open to said lower portion and a bore extending from said small chamber to said upper portion, a plug slidably positioned in said bore, means for selectively moving said plug in said bore to project a selected distance therefrom into said small chamber, and a transverse V-notch in the end of said plug remote from said small chamber.

6. Apparatus as defined in claim 1 including an expansible chamber reservoir adjacent said tank chamber, means defining a passageway communicating between said reservoir and said tank chamber, a selectively operable valve controlling said passageway, and selectively operable means for expanding or contracting the reservoir chamber whereby to cause liquid to flow through said valve to or from said tank chamber to regulate the quantity of liquid in said tank chamber.

7. A temperature-compensated weighing apparatus comprising, a tank adapted to hold a body of liquid, the side wall of the lower portion of said tank chamber being inwardly of the side wall of the upper portion thereof and defining an inward projection, a vertically movable weighing float in said tank chamber with a bottom surface in said lower portion and spaced from the bottom of said tank chamber a predetermined distance, said float extending upwardly into said upper portion, the volume of said inward projection being substantially equal to the volume of the space between the bottom of said tank chamber and said bottom surface of said float, the cross-sectional area of the upper portion of said tank chamber being constant, and means limiting vertical movement of said float to maintain the bottom thereof at substantially said predetermined distance from the bottom of said tank chamber at all times.

8. Weighing apparatus as defined in claim 7 wherein said projection extends peripherally around the inside of said tank chamber and terminates in an inner vertical surface very closely adjacent the sides of said float.

9. Weighing apparatus as defined in claim 7 wherein the inner surfaces of said tank chamber and said projection and the outer surface of said float are all parallel and vertical.

10. Weighing apparatus as defined in claim 7 wherein the upper end of said projection defines an abrupt and substantially horizontal step.

References Cited in the file of this patent

UNITED STATES PATENTS

| 1,013,479 | Elliott | Jan. 2, 1912 |
| 2,597,949 | Rappaport et. al. | May 27, 1952 |

FOREIGN PATENTS

| 4,657 | Netherlands | Feb. 2, 1920 |
| 1,020,289 | France | June 16, 1952 |